March 25, 1969　　　D. C. BRUNTON　　　3,435,240
RADIATION SENSITIVE STRUCTURE DETERMINING APPARATUS
Filed Jan. 2, 1964
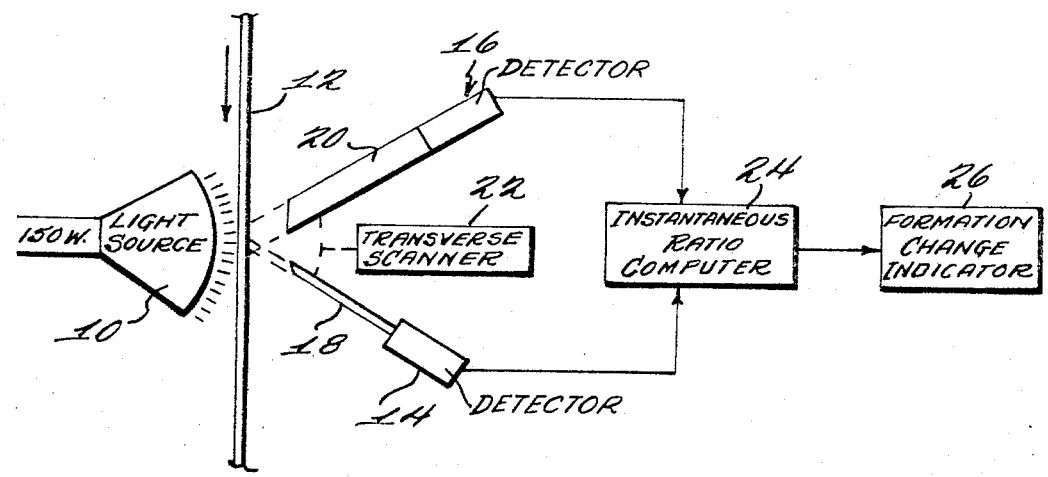
INVENTOR
DONALD C. BRUNTON
BY Cushman, Darby & Cushman
ATTORNEY United States Patent Office 3,435,240
Patented Mar. 25, 1969

3,435,240
RADIATION SENSITIVE STRUCTURE
DETERMINING APPARATUS
Donald C. Brunton, Columbus, Ohio, assignor to Industrial Nucleonics Corporation, a corporation of Ohio
Filed Jan. 2, 1964, Ser. No. 335,030
Int. Cl. G01n 21/30; G01l 5/04
U.S. Cl. 250—219                                                10 Claims

ABSTRACT OF THE DISCLOSURE

Disclosed herein is apparatus for determining variations in formation structure of energy transparent material, such as paper, by taking the instantaneous quotient of first and second signals resulting from energy transmitted simultaneously through relatively small and large associated areas of the material preferably while the material and energy transmitters are relatively moved.

This invention relates to determining the uniformity of variations in the distribution of randomly oriented elements comprising a sheet of material. In particular, it relates to the gauging of "formation" of paper.

For an introduction to this general type of gauging, reference may be made to the Burkhard et al. article "A Formation Tester Which Graphically Records Paper Structure," which appeared in the June 1960 issue of Pulp and Paper Magazine of Canada, beginning at page T–319. There, it is indicated that when a sheet of paper looks uniform on viewing it up to the light, its formation is called good, while an irregular, grainy or blotchy structure may be described as such or may be called "wild" formation.

It is the foremost object of this invention to provide improved apparatus for determining the structural variations in material, such as the formation of paper.

By this invention, an electronic measurement is made of the variation in the percent transmittance of light through paper being tested, with means being provided to effect an output corresponding to the formation of the paper.

It has been suggested in the past that the ratio of the AC to the DC component of transmitted light, expressed as a percentage, be taken as indicative of the formation wildness: see page 1278 of Pulp and Paper, Volume III, Second Edition, by Casey; Williams Patent 2,844,068; and the C. J. Moen Papers "A Formation Standard," Tappi, April 1958, Volume 41, No. 4, pages 212A–213A, and "Theory of Differential Sensing," starting at page 34 of the Technical Section, Tappi, January 1963, Volume 46, No. 1. In these disclosures, and also in the Eastwood Paper published in the last mentioned Tappi beginning at page 32 and entitled "A Continuous Two-Spot Formation Recorder," there is the suggestion that two spots of light be employed to measure formation of paper. However, these spots of light are of equal size and the differences between the signals attained therefrom do not present an accurate indication of paper formation, because they do not take into account a large background area.

It is therefore an object of the present invention to provide a formation determining apparatus which does take into account a large background area, by operating in a manner similar to the human eye when it observes the structure of paper having light passing through it. It has been found that the eye sees the variation in the percent transmittance of light through the sheet of paper. In effect the eye compares the light coming through any one small spot with the average of the transmitted light from the vicinity of that spot, for example from a relatively large area surrounding the small spot area.

In accordance with the present invention, which is based on the above discovery of the workings of the eye in evaluating paper as to its formation, this invention compares the transmittance from a small spot of light on the paper with that of a much larger area of light on the paper.

In one embodiment of the invention two photomultipliers of different intake dimensions, for example collimating tubes having light apertures of two inches diameter and 0.2 inch diameter, are directed toward the paper on the other side of which is a source of light. In any desirable manner, relative motion is effected between the paper and the photomultipliers and light source, whereby signals are induced in the photomultipliers according to what they "see." The output signals from the photomultipliers are applied to a ratio indicator to give an indication of the formation of the paper as it is scanned by the relative movement effect. The word "ratio" as used throughout this application means quotient such as is obtained by dividing the output signals from the photomultipliers.

It is another object of this invention, therefore, to provide apparatus of the type above mentioned, whereby an accurate formation indication may be obtained.

Other objects and advantages of this invention will become apparent to those of ordinary skill in the art upon reading the appended claims and the following detailed description of one embodiment of the invention, which is illustrated in the drawing.

In the drawing, element 10 represents any desirable source of light for example a 150-watt lamp, which transilluminates a strip of paper 12 being moved across the face of source 10 in any conventional manner. It is to be understood that this invention may be applied not only to paper but to any other type of material to which it is applicable at any stage in its manufacture, as well as any time after it has been manufactured. A convenient place in a paper mill for this apparatus however, is adjacent the manufacturing equipment, say, ahead of the calenders, or thereafter, whereby a constant review of the paper formation can be obtained and corrections can be made in the manufacturing process to return the formation to something more desirable. This may be done manually, or automatically, as desired, with the control being effected to cause the fibers in the paper sheet to randomly orient in a different manner so as to increase the quality of formation.

It is also to be appreciated that the energy source 10 may radiate other than light rays, for example X-rays, gamma rays, etc., instead, and of course the detection apparatus mentioned below will correspond.

On the opposite side of the paper strip 12 are two radiation sensing detectors such as photodetectors or phototubes in the form of photomultipliers 14 and 16. These are light detectors of conventional type and they are preferably the same except photomultiplier 14 has a much smaller input collimating tube 18 than the input collimating tube 20 of photomultiplier 16. As exemplary, the diameter of input tube 20 may be 1 inch, while that of input tube 18 is 0.1 inch. Both photomultipliers are preferably directed toward a common area of paper 12, but of course each receives light from different size areas, according to their respective input dimensions. Rather than serving a common area wherein the smaller spot is surrounded by the larger area as preferable, it is feasible to sense touching or overlapping areas, or perhaps slightly separated areas, since the desire in this regard is to compare the light transmitted from a small spot with the average light transmitted from the vicinity or immediate area of that small spot.

Scanning of the paper may take place merely by movement of the paper longitudinally, while the light source and photomultipliers are stationary. On the other hand, the light source may be made broad enough to cover the width of the paper while it moves longitudinally, and the photomultipliers may be scanned transversely of the paper by scanner 22.

The light hignals emanating from the two different sized areas and sensed by the photomultipliers are compared in a manner that closely follows the action of the human eye. The eye sees instantaneously both the total light coming from a large area and the light coming from a small area within or adjacent that large area and compares these, thereby distinguishing changes in light intensity from the small area that have no corresponding variation in the light from the large area, i.e. the eye sees as formation the variation in light coming through contiguous portions of the paper compared to the average for that portion of the paper.

The narrow and broad light beams in collimators 18 and 20 give that same ability, i.e. to compare the transmitted light at any point with the average transmitted light in the vicinity of that point. As the paper moves, or scanning is instead or additionally otherwise provided, the small spot transmittance changes in accordance with variations in the paper while the large spot transmittance will tend to stay constant (except when the average weight of the paper changes, but then both spots respond to this equally). Hence, true formation is given by the instantaneous ratio i.e., quotient of the two detected light signals.

To determine that instantaneous ratio continuously, a ratio computer 24 is connected to the outputs of the photoomplitiplers. The output of the computer represents that ratio and it may be indicated by any desired formation change indicator 26. For example see either of the following patents, which disclose circuitry usable as applicant's instantaneous ratio computer 24: Heacock, Jr., No. 3,024,999, issued Mar. 13, 1962 and Larse, No. 2,905,385, issued Sept. 22, 1959.

From the foregoing, it is apparent that no averaging of the detected light signals is necessary, because the signal from the large area represents an average at any one instant that can be compared with the small area signal which follows instantaneous variations for a precise identification of an effective change only in the small spot signal. Taking an "instantaneous ratio" with computer 24 means that once the light signals are detected, they are immediately compared and no electronic averaging or the like occurs other than any instantaneous averaging inherent in detectors 14 and 16.

Any number of circuits may be employed in the ratio computer as indicated above. Additionally, when the photodetectors are diodes having a logarithmic response to light, the computer may take the form of two logarithmic amplifiers connected from the diode detector outputs respectively, to a differential amplifier, then to a rectifier and readout, in a conventional manner. In the case where the photodetectors have a linear response, there can be used a standard ratio computer which takes the log of each signal, subtracts the log signals, and then use an anti-log circuit to read out a signal that is a linear function of the ratio.

In the above described embodiment, it is indicated that the photomultipliers may be transversely scanned across the width of the sheet of paper. Instead of this, conventional television cameras may be employed to provide the small spot output signals, such as those available from detector 14 in the described embodiment. It is, of course, necessary that the scanning be sufficiently rapid that the paper has moved very little longitudinally, say, less than 1 mm. between the start of successive scans. Typical paper speeds in production are approximately 1800 ft./min. or 30 ft./sec., which is approximately $10^4$ mm./sec. Television camera scan speeds are normally approximately $40\mu$ sec./scan or $0.4 \times 10^{-4}$ sec. Hence, paper motion is less than 1 mm. between scans, and, indeed, paper speeds of up to at least 4000 ft./min. can be tolerated. If the paper speed is decreased, the scans become closer together, but since they are already close enough to resolve the formation variation, further closing up of the scans would have no adverse effect in the measurement.

What has been said in the previous paragraph concerning scans by use of television cameras or the like, is also applicable to scanning the photomultiplier tubes 14 and 16, though, of course, this requires mechanical operations which cannot be as fast as the flying spot of a television camera.

Traversals of the photomultiplier tubes may be effected by conventional beta gauge traversing equipment used in the measurement of other characteristics such as thickness of paper and other sheets of material.

As previously indicated, formation describes local percent variations in paper measurement area or thickness. Therefore, formation $f$ may be stated in equation form as follows:

$$f = k \frac{\Delta t}{t}$$

As well known, absorption of light by paper is exponential, in accordance with the equation:

$$I = I_0 e^{-at}$$

Therefore, variations in light signified by the quantity $\Delta I$ may be ratioed to the total amount of light $I$ in the following manner:

$$\frac{\Delta I}{I} = -at \frac{\Delta t}{t} = atf$$

which reduces to:

$$f = \frac{1}{at} \frac{\Delta I}{I}$$

From the foregoing equations, it is therefore apparent that a formation measurement will be indicated by measuring $\Delta I$ and dividing it by a measure of I. This is what the equipment shown in the drawing accomplishes, since the signal from the detector 14 is proportional to the instantaneous value of the AC output of the small or narrow channel, i.e. to changes in light $\Delta I$, while the signal from detector 16 is proportional to the amount of light I detected over a large area and the instantaneous ratio thereof is taken.

It is an important and basic feature of this invention that the ratio or comparison must be between a signal from a small area which represents instantaneous variation and a signal from a much larger area that, in essence, represents an instantaneous average which preferably includes the variation from the small area.

The above equations indicates that the ratio obtained by computer 24 should be corrected by a voltage $1/t$ to make the result independent of grade changes in basis weight. This is not essential, however, since a calibration versus weight is sufficient.

From the foregoing description, it is apparent that this invention has provided for the objects and advantages herein mentioned. Other objects and advantages, and even further modifications of the invention, will become apparent to those of ordinary skill in the art upon reading this disclosure. However, it is to be realized that this disclosure is exemplary and not limitative, the invention being defined by the appended claims.

What is claimed is:

1. Apparatus for determining variations in formation structure of paper material which will transmit radiation energy, comprising:
   radiation energy source and detector means disposed to face opposite sides of said material for causing the said energy to be transmitted through said material and detected then as first and second signals respectively representing the material structure in a relatively small area of material and the instantaneous average material structure in a relatively large area of said material, means for effectively causing relative movement of said material and the aforesaid means to cause said first signal to change in accordance with said material variations while said second signal stays essentially constant because of said relatively large area, and means for taking the instantaneous quotient of said first and second signals during said relative movement to give an indication of the structure variations in said material.

2. Apparatus for determining variations in formation structure of a sheet of paper material which will transmit radiation energy, comprising:

means for directing radiation energy toward one side of said sheet to transilluminate the sheet, means for collecting the said energy transmitted from said sheet including first and second collectors having energy intake dimensions differing substantially whereby the first collector has a relatively small intake and the second collector a relatively large intake, means for causing relative movements of said sheet and collecting means, and means for taking the instantaneous ratio of the outputs of said collectors.

3. Apparatus for determining formation of paper comprising:

means for transilluminating said paper with light energy, means for collecting the said energy transmitted through said paper for providing first and second output signals related to the degree of transmission, at least one of said aforementioned means including means for causing said first and second output signals to be related to different size areas of said paper, said second signal being related to an area which is many times larger than the area to which said first signal is related, means for effecting a scanning movement between said paper and the different size area causing means, and means for taking the instantaneous ratio of said first and second output signals during said scanning movement to give an indication by said ratio of the formation of said paper.

4. Apparatus as in claim 3 wherein said energy collecting means and the means for determining the size of said areas includes two light detectors having respective light intake tubes with the dimension thereof differing from the aforesaid many times.

5. Apparatus as in claim 3 wherein said first signal area is located within said second signal area.

6. For use with equipment causing paper material to move, apparatus for determining variations in the formation structure of said material, said material being capable of transmitting radiation energy, comprising:

radiation energy source and detector means for causing the said energy to be transmitted through said material and detected then as first and second signals respectively representing by a given characteristic instantaneous variations in material structure in successive relatively small areas of said material and the instantaneous average material structure in respective relatively large areas thereof in the vicinity of the corresponding small area as said material moves as aforesaid, and means for instantaneously dividing said first and second signals during such movement to give an indication of the true structural variations in said material.

7. Apparatus as in claim 6 wherein said given characteristic is intensity, said areas are contiguous, and said dividing means determines the instantaneous ratio of said signals.

8. Apparatus as in claim 7 wherein said large area surrounds said small area.

9. In apparatus for inspecting energy transparent material as to its formation structure variations by considering signals representing said structure variations and resulting from energy transmitted through the material, the improvement comprising:

means for detecting first and second signals resulting from energy transmitted simultaneously through relatively small and large associated areas of the material, and means for taking the instantaneous quotient of said signals to provide an indication of the structure variation in said material.

10. In apparatus for determing formation structure variations of energy transparent material by considering radiation signals transmitted through the material, the improvement comprising:

means for directing radiation signals through said material, means for detecting the through transmitted signals from relatively small and large associated areas of said material, and means for taking the instantaneous quotient of said small and large area signals to provide an indication of formation variations in said material.

References Cited

UNITED STATES PATENTS

| | | | |
|---|---|---|---|
| 1,917,379 | 7/1933 | Lowry | 250—219 |
| 2,429,331 | 10/1947 | Sachtleben | 250—219 |
| 2,919,624 | 1/1960 | Lindemann et al. | 250—219 |
| 3,059,119 | 10/1962 | Zenor | 250—230 X |
| 3,114,791 | 12/1963 | Zabel et al. | 250—219 |

WALTER STOLWEIN, *Primary Examiner.*

U.S. Cl. X.R.

73—159

UNITED STATES PATENT OFFICE
CERTIFICATE OF CORRECTION

Patent No. 3,435,240              Dated March 25, 1969

Inventor(s) Donald C. Brunton

It is certified that error appears in the above-identified patent and that said Letters Patent are hereby corrected as shown below:

Column 1, line 68 "effect the" should read ---effect, the---.

Column 2, line 30, "light for" should read ---light, for---.

Column 3, line 6, "hiquals" should read ---signals---; column 3, line 32, "photoomplitiplers" should read ---photomultipliers---.

Column 4, lines 31-33, "$-\alpha t \, \Delta t = \alpha t f$" should read ---$-\alpha t \, \frac{\Delta t}{t} = -\alpha t f$---.

Claim 2, column 5, line 25, "ratio" should read ---quotient---.

Claim 3, column 5, line 44, "ratio" should read ---quotient---.

Claim 4, column 5, line 49, "differing from the" should read ---differing the---.

SIGNED AND SEALED
JAN 19 1971

(SEAL)
Attest:

Edward M. Fletcher, Jr.
Attesting Officer

WILLIAM E. SCHUYLER, JR.
Commissioner of Patents